(12) United States Patent
Gore et al.

(10) Patent No.: US 8,326,655 B2
(45) Date of Patent: Dec. 4, 2012

(54) SYSTEM AND METHOD OF MANAGING AN INSURANCE SCHEME

(75) Inventors: Adrian Gore, Houghton Estate (ZA); Herschel Phillip Mayers, Johannesburg (ZA); Kenneth Steven Rabson, Johannesburg (ZA)

(73) Assignee: Discovery Holdings Limited, Sandton (ZA)

( * ) Notice: Subject to any disclaimer, the term of this patent is extended or adjusted under 35 U.S.C. 154(b) by 296 days.

(21) Appl. No.: 12/477,213

(22) Filed: Jun. 3, 2009

(65) Prior Publication Data
US 2009/0299776 A1 Dec. 3, 2009

(30) Foreign Application Priority Data

Jun. 3, 2008 (ZA) .................................. 2008/04809

(51) Int. Cl.
*G06Q 40/00* (2006.01)
(52) U.S. Cl. ................. 705/4; 705/3; 705/35; 705/36 R; 705/38
(58) Field of Classification Search .................. 705/3, 4, 705/35, 36 R, 38
See application file for complete search history.

(56) References Cited

U.S. PATENT DOCUMENTS

| | | |
|---|---|---|
| 4,556,216 A | 12/1985 | Pitkanen |
| 4,699,375 A | 10/1987 | Appelbaum et al. |
| 4,831,526 A | 5/1989 | Luchs et al. |
| 4,837,693 A | 6/1989 | Schotz |
| 4,860,275 A | 8/1989 | Kakinuma et al. |
| 4,975,840 A | 12/1990 | DeTore et al. |
| 5,062,645 A | 11/1991 | Goodman et al. |
| 5,136,502 A | 8/1992 | Van Remortel et al. |
| 5,297,026 A | 3/1994 | Hoffman |
| 5,301,105 A | 4/1994 | Cummings, Jr. |
| 5,324,077 A | 6/1994 | Kessler et al. |
| 5,429,506 A | 7/1995 | Brophy et al. |
| 5,490,260 A | 2/1996 | Miller et al. |
| 5,542,420 A | 8/1996 | Goldman et al. |
| 5,549,117 A | 8/1996 | Tacklind et al. |
| 5,550,734 A | 8/1996 | Tarter et al. |
| 5,574,803 A | 11/1996 | Gaborski et al. |
| 5,630,073 A | 5/1997 | Nolan |
| 5,631,828 A | 5/1997 | Hagan |

(Continued)

FOREIGN PATENT DOCUMENTS

AU 2001/276596 3/2003

(Continued)

OTHER PUBLICATIONS

Discovery Life, "The Discovery Life portfolio" 2008.*

(Continued)

*Primary Examiner* — Neal Sereboff
(74) *Attorney, Agent, or Firm* — Fleit Gibbon Gutman Bongini & Bianco, PL; Paul D. Bianco; Gary S. Winer

(57) ABSTRACT

A system for managing an insurance scheme includes a benefit module to define at least one insured event for an insured person and to define at least one benefit to be paid out on the occurrence of one of the insured events. A calculation module alters the at least one benefit based on a) a time factor; and b) the life impact of the insured event on the insured person. An awards module, on the occurrence of the at least one insured event, provides the at least one altered benefit to the insured person.

15 Claims, 3 Drawing Sheets

U.S. PATENT DOCUMENTS

| | | | | |
|---|---|---|---|---|
| 5,655,085 | A | 8/1997 | Ryan et al. | |
| 5,655,997 | A | 8/1997 | Greenberg et al. | |
| 5,692,501 | A | 12/1997 | Minturn | |
| 5,722,418 | A | 3/1998 | Bro | |
| 5,745,893 | A | 4/1998 | Hill et al. | |
| 5,752,236 | A | 5/1998 | Sexton et al. | |
| 5,774,883 | A | 6/1998 | Andersen et al. | |
| 5,832,467 | A | 11/1998 | Wavish | |
| 5,867,821 | A | 2/1999 | Ballantyne et al. | |
| 5,890,129 | A | 3/1999 | Spurgeon | |
| 5,933,809 | A | 8/1999 | Hunt et al. | |
| 5,933,815 | A | 8/1999 | Golden | |
| 5,937,387 | A | 8/1999 | Summerell et al. | |
| 5,956,691 | A | 9/1999 | Powers | |
| 5,987,434 | A | 11/1999 | Libman | |
| 5,991,744 | A | 11/1999 | DiCresce | |
| 6,039,688 | A | 3/2000 | Douglas et al. | |
| 6,049,772 | A | 4/2000 | Payne et al. | |
| 6,085,174 | A | 7/2000 | Edelman | |
| 6,085,976 | A | 7/2000 | Sehr | |
| 6,108,641 | A | 8/2000 | Kenna et al. | |
| 6,112,986 | A | 9/2000 | Berger et al. | |
| 6,151,586 | A | 11/2000 | Brown | |
| 6,169,770 | B1 | 1/2001 | Gamble et al. | |
| 6,230,142 | B1 | 5/2001 | Benigno et al. | |
| 6,338,042 | B1 | 1/2002 | Paizis | |
| 6,385,589 | B1 | 5/2002 | Trusheim et al. | |
| 6,513,532 | B2 | 2/2003 | Mault et al. | |
| 6,587,829 | B1 | 7/2003 | Camarda et al. | |
| 6,602,469 | B1 | 8/2003 | Maus et al. | |
| 6,611,815 | B1 | 8/2003 | Lewis et al. | |
| 6,965,868 | B1 | 11/2005 | Bednarek | |
| 7,319,970 | B1 | 1/2008 | Simone | |
| 7,380,707 | B1 | 6/2008 | Fredman | |
| 7,383,223 | B1 | 6/2008 | Dilip et al. | |
| 7,398,217 | B2 | 7/2008 | Lewis | |
| 7,624,032 | B2 | 11/2009 | Rabson | |
| 7,630,937 | B1 | 12/2009 | Mo et al. | |
| 7,685,007 | B1 | 3/2010 | Jacobson | |
| 7,797,175 | B2 | 9/2010 | Luedtke | |
| 8,131,570 | B2 | 3/2012 | Douglas | |
| 2001/0037214 | A1 | 11/2001 | Raskin et al. | |
| 2001/0053984 | A1* | 12/2001 | Joyce et al. | 705/2 |
| 2002/0002495 | A1 | 1/2002 | Ullman | |
| 2002/0013717 | A1 | 1/2002 | Ando et al. | |
| 2002/0016923 | A1 | 2/2002 | Knaus | |
| 2002/0029158 | A1 | 3/2002 | Wolff et al. | |
| 2002/0035486 | A1 | 3/2002 | Huyn et al. | |
| 2002/0038310 | A1 | 3/2002 | Reitberg | |
| 2002/0042763 | A1 | 4/2002 | Pillay | |
| 2002/0049617 | A1 | 4/2002 | Lencki et al. | |
| 2002/0055859 | A1 | 5/2002 | Goodman et al. | |
| 2002/0087364 | A1 | 7/2002 | Lerner et al. | |
| 2002/0103678 | A1 | 8/2002 | Burkhalter et al. | |
| 2002/0111827 | A1 | 8/2002 | Levin et al. | |
| 2002/0116231 | A1 | 8/2002 | Hele et al. | |
| 2002/0116266 | A1 | 8/2002 | Marshall | |
| 2002/0138309 | A1 | 9/2002 | Thomas | |
| 2002/0152097 | A1 | 10/2002 | Javors | |
| 2002/0184129 | A1 | 12/2002 | Arena | |
| 2003/0009355 | A1 | 1/2003 | Gupta | |
| 2003/0028483 | A1 | 2/2003 | Sanders et al. | |
| 2003/0055767 | A1 | 3/2003 | Tamura | |
| 2003/0065561 | A1 | 4/2003 | Brown | |
| 2003/0120521 | A1 | 6/2003 | Sherman | |
| 2003/0120570 | A1 | 6/2003 | Dellinger | |
| 2003/0135391 | A1 | 7/2003 | Edmundson | |
| 2003/0149596 | A1 | 8/2003 | Bost | |
| 2003/0194071 | A1 | 10/2003 | Ramian | |
| 2003/0200101 | A1 | 10/2003 | Adler | |
| 2003/0200142 | A1 | 10/2003 | Hicks et al. | |
| 2003/0208385 | A1 | 11/2003 | Zander | |
| 2003/0212579 | A1* | 11/2003 | Brown et al. | 705/2 |
| 2003/0233278 | A1 | 12/2003 | Marshall | |
| 2004/0030625 | A1 | 2/2004 | Rabson et al. | |
| 2004/0039608 | A1 | 2/2004 | Mazur | |
| 2004/0039611 | A1 | 2/2004 | Hong et al. | |
| 2004/0059608 | A1 | 3/2004 | Gore et al. | |
| 2004/0088219 | A1 | 5/2004 | Sanders et al. | |
| 2004/0098279 | A1 | 5/2004 | Frazier | |
| 2004/0138928 | A1 | 7/2004 | Monk | |
| 2004/0267570 | A1 | 12/2004 | Becker et al. | |
| 2005/0010453 | A1 | 1/2005 | Terlizzi | |
| 2005/0033609 | A1 | 2/2005 | Yang | |
| 2005/0038679 | A1 | 2/2005 | Short | |
| 2005/0055249 | A1 | 3/2005 | Helitzer | |
| 2005/0060209 | A1 | 3/2005 | Hill | |
| 2005/0071205 | A1 | 3/2005 | Terlizzi | |
| 2005/0102172 | A1 | 5/2005 | Sirmans | |
| 2005/0131742 | A1 | 6/2005 | Hoffman et al. | |
| 2005/0222867 | A1* | 10/2005 | Underwood et al. | 705/2 |
| 2005/0222877 | A1 | 10/2005 | Rabson et al. | |
| 2005/0222878 | A1 | 10/2005 | Rabson et al. | |
| 2005/0228692 | A1 | 10/2005 | Hodgdon | |
| 2005/0234742 | A1* | 10/2005 | Hodgdon | 705/2 |
| 2005/0240449 | A1 | 10/2005 | Rabson et al. | |
| 2005/0256748 | A1 | 11/2005 | Gore et al. | |
| 2005/0288971 | A1 | 12/2005 | Cassandra | |
| 2006/0041454 | A1 | 2/2006 | Matisonn et al. | |
| 2006/0064320 | A1 | 3/2006 | Postrel | |
| 2006/0074801 | A1 | 4/2006 | Pollard et al. | |
| 2006/0129436 | A1 | 6/2006 | Short | |
| 2006/0143055 | A1 | 6/2006 | Loy | |
| 2006/0143056 | A1 | 6/2006 | Taylor | |
| 2006/0218011 | A1 | 9/2006 | Walker et al. | |
| 2006/0218023 | A1 | 9/2006 | Conrad | |
| 2007/0027726 | A1 | 2/2007 | Warren et al. | |
| 2007/0050215 | A1* | 3/2007 | Kil et al. | 705/3 |
| 2007/0050217 | A1 | 3/2007 | Holden, Jr. | |
| 2007/0061237 | A1 | 3/2007 | Merton | |
| 2007/0094125 | A1 | 4/2007 | Izyayev | |
| 2007/0112669 | A1 | 5/2007 | Snyder | |
| 2007/0136093 | A1 | 6/2007 | Rankin | |
| 2007/0233512 | A1 | 10/2007 | Gore | |
| 2008/0005016 | A1 | 1/2008 | Uhlmann | |
| 2008/0033751 | A1 | 2/2008 | Greene | |
| 2008/0046382 | A1 | 2/2008 | Metz | |
| 2008/0071600 | A1 | 3/2008 | Johnson | |
| 2008/0082372 | A1 | 4/2008 | Burch | |
| 2008/0091471 | A1 | 4/2008 | Michon | |
| 2008/0154650 | A1 | 6/2008 | Matisonn et al. | |
| 2008/0172214 | A1* | 7/2008 | Col et al. | 703/11 |
| 2008/0189141 | A1 | 8/2008 | Gore et al. | |
| 2008/0197185 | A1 | 8/2008 | Cronin et al. | |
| 2008/0243558 | A1 | 10/2008 | Gupte | |
| 2008/0255979 | A1 | 10/2008 | Slutzky et al. | |
| 2008/0262877 | A1 | 10/2008 | Hargroder | |
| 2008/0312969 | A1 | 12/2008 | Raines | |
| 2009/0024419 | A1 | 1/2009 | McClellan et al. | |
| 2009/0024478 | A1 | 1/2009 | Dixon | |
| 2009/0037230 | A1 | 2/2009 | Tracy | |
| 2009/0076903 | A1 | 3/2009 | Schwarzberg et al. | |
| 2009/0105550 | A1* | 4/2009 | Rothman et al. | 600/300 |
| 2009/0150189 | A1 | 6/2009 | Barron | |
| 2009/0150192 | A1 | 6/2009 | Gore et al. | |
| 2009/0164256 | A1 | 6/2009 | Fisher | |
| 2009/0198525 | A1 | 8/2009 | Gore et al. | |
| 2009/0204441 | A1 | 8/2009 | Read | |
| 2009/0204446 | A1 | 8/2009 | Simon | |
| 2009/0204447 | A1 | 8/2009 | Tucker | |
| 2009/0240532 | A1 | 9/2009 | Gore et al. | |
| 2009/0259497 | A1 | 10/2009 | Gore et al. | |
| 2009/0265183 | A1 | 10/2009 | Pollard et al. | |
| 2009/0299773 | A1 | 12/2009 | Gore et al. | |
| 2009/0299774 | A1 | 12/2009 | Gore et al. | |
| 2009/0299775 | A1 | 12/2009 | Gore et al. | |
| 2009/0299776 | A1 | 12/2009 | Gore et al. | |
| 2009/0307015 | A1 | 12/2009 | Gore et al. | |
| 2010/0023354 | A1 | 1/2010 | Gore et al. | |
| 2010/0023384 | A1 | 1/2010 | Pollard et al. | |
| 2010/0049541 | A1 | 2/2010 | Pollard et al. | |

FOREIGN PATENT DOCUMENTS

| | | |
|---|---|---|
| AU | 2005/323847 | 2/2007 |
| AU | 2007/257457 | 1/2009 |
| AU | 2007/257458 | 1/2009 |
| AU | 2007/257546 | 1/2009 |

| | | |
|---|---|---|
| AU | 2007/298514 | 2/2009 |
| AU | 2007/301521 | 5/2009 |
| CN | 2005/880047059 | 7/2007 |
| EP | 1050821 | 11/2000 |
| IL | 195735 | 12/2008 |
| IL | 195737 | 12/2008 |
| IL | 195738 | 12/2008 |
| WO | 02/47074 | 6/2002 |
| WO | 03/007230 | 1/2003 |
| WO | 2007/141685 | 12/2007 |
| WO | 2007/141696 | 12/2007 |
| WO | 2007/141968 | 12/2007 |
| WO | 2008/035280 | 3/2008 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-03529 | 4/2008 |
| ZA | 2008/04807 | 6/2008 |
| ZA | 2008/04808 | 6/2008 |
| ZA | 2008/04810 | 6/2008 |
| ZA | 2008/04811 | 6/2008 |
| ZA | 200804809 | 6/2008 |
| ZA | 2009/01740 | 3/2009 |

OTHER PUBLICATIONS

Discovery Life, "Why Discoery Life" May 29, 2008.*
Wenfin Financial Services, Website downloaded Aug. 5, 2011.*
AFLAC, "Personal Cancer Indemnity Plan" Jun. 2005.*
AFLAC, "Personal Disability Income Protector" Jul. 2003.*
GE Group Life Assurance Company, "Group Short Term Disability Insurance" Oct. 1, 2004.*
EconEdLink, "How Long Is Your Life?" Tutorial from EconEdLink.com website, posted Sep. 13, 2004.*
Gendell, Murray, "Retirement age declines again in 1990s" Monthly Labor Review, Oct. 2001.*
U.S. Appl. No. 12/477,225, Non-final Office Action Mar. 25, 2011.
U.S. Appl. No. 12/122,549, Non-final Office Action Mar. 30, 2011.
U.S. Appl. No. 12/333,465, Non-final Office Action Mar. 30, 2011.
U.S. Appl. No. 11/189,647, Response to Office Action Apr. 18, 2011.
U.S. Appl. No. 12/303,395, Non-Final Rejection Apr. 29, 2011.
U.S. Appl. No. 12/303,391, Final Office Action May 11, 2011.
U.S. Appl. No. 10/344,176, Office Action May 16, 2011.
U.S. Appl. No. 11/074,453, Requirement for Election May 23, 2011.
U.S. Appl. No. 12/303,388 Response Jun. 8, 2011.
U.S. Appl. No. 12/303,395 Final Office Action Jun. 13, 2011.
U.S. Appl. No. 12/333,465, Response filed Jun. 30, 2011.
U.S. Appl. No. 12/122,549, Response filed Jul. 21, 2011.
U.S. Appl. No. 12/303,388 Final Office Action Jul. 5, 2011.
U.S. Appl. No. 11/189,647, Final Office Action Jun. 22, 2011.
U.S. Appl. No. 12/477,225, Non Final Office Action Jul. 8, 2011.
U.S. Appl. No. 12/441,447, Non Final Office Action Aug. 1, 2011.
U.S. Appl. No. 12/477,179, Non final office action Jul. 22, 2011.
U.S. Appl. No. 12/477,208, Non final office action Jul. 22, 2011.
U.S. Appl. No. 12/477,189 non final Office Action Aug. 5, 2011.
U.S. Appl. No. 12/303,391 RCE response Aug. 11, 2011.
U.S. Appl. No. 11/189,647, Response Aug. 12, 2011.
U.S. Appl. No. 12/303,388 Response Sep. 2, 2011.
U.S. Appl. No. 12/442,549 non Final Office Action Sep. 19, 2011.
U.S. Appl. No. 12/477,225 Final Office Action Sep. 28, 2011.
U.S. Appl. No. 12/333,465 Final Office Action Oct. 4, 2011.
U.S. Appl. No. 12/477,179, Response filed Oct. 24, 2011.
U.S. Appl. No. 12/122,549, Final Office Action Oct. 6, 2011.
U.S. Appl. No. 12/122,549, RCE response Jan. 6, 2012.
U.S. Appl. No. 11/074,453, Office Action Oct. 11, 2011.
U.S. Appl. No. 12/912,040, Office Action Oct. 20, 2011.
U.S. Appl. No. 12/441,447, Response filed Nov. 1, 2011.
U.S. Appl. No. 12/477,189, Response filed Nov. 4, 2011.
U.S. Appl. No. 12/721,619, Preliminary Amendment filed Nov. 3, 2011.
U.S. Appl. No. 11/903,607, Office Action Nov. 30, 2011.
U.S. Appl. No. 12/477,189 Final Office Action Dec. 5, 2011.
U.S. Appl. No. 12/912,009 Non-final Office Action Dec. 19, 2011.
U.S. Appl. No. 11/794,830, Non-Final Rejection Dec. 19, 2011.
U.S. Appl. No. 11/074,453, Response filed Jan. 11, 2012.
U.S. Appl. No. 12/477,225, RCE Response filed Jan. 25, 2012.
U.S. Appl. No. 12/333,465, RCE Response filed Jan. 26, 2012.
U.S. Appl. No. 13/365,566 filed Feb. 3, 2012.
U.S. Appl. No. 13/365,430 filed Feb. 3, 2012.
U.S. Appl. No. 13/365,527 filed Feb. 3, 2012.
U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.
U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief Filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.
U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief Filed Mar. 24, 2010.
U.S. Appl. No. 12/122,549, filed May 16, 2008.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,395, filed Dec. 4, 2008.
U.S. Appl. No. 12/303,399, filed Dec. 4, 2008.
U.S. Appl. No. 12/441,447, filed Mar. 16, 2009.
U.S. Appl. No. 10/344,176, filed Aug. 15, 2003.
U.S. Appl. No. 10/344,176, Final Rejection Oct. 30, 2008.
U.S. Appl. No. 10/344,176, Final Rejection Mar. 2, 2010.
U.S. Appl. No. 10/344,176, Non-Final Rejection Dec. 19, 2007.
U.S. Appl. No. 10/344,176, Non-Final Rejection Jun. 8, 2009.
U.S. Appl. No. 10/344,176, Response to Office Action May 19, 2008.
U.S. Appl. No. 10/344,176, Response to Office Action Mar. 2, 2009.
Rintelman, Mary Jane, "Choice and cost-savings", Credit Union Management, vol. 19, No. 7, pp. 48, 50. Jul. 1996.
Woodard, Kathy, "stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.

Communuity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.
Ferling ("New plans, New policies," Ferling, Rhona. Best's Review; Apr. 1993 p. 78).
"Plan Highlights for EL Paso ISD" Salary Protection Insurance Plan, web-site—http://w3.unumprovident.com/enroll/elpasoisd/your_plan.htm, Mar. 3, 2008.
Consumer-Driven Health Plans Catch on as Myths Fall by Wayside (Sep. 4 ). PR Newswire, 1.
Art Technology Group; Discovery Holdings to exploit online interest in healthcare and life assurance with ATG commerce functionality; Revenue potential significant as 70% of Discovery members access the internet. (Oct. 28). M2 Presswire, 1.
"Absenteeism Control"; Cole, Thomas C. et al; Management Decision; London: 1992. vol. 20, Iss. 2; p. 12 (AC).
Saleem, Haneefa: "Health Spending Accounts"; Dec. 19, 2003; posted online at http://www.bls.gov/opub/cwc/print/cm20031022ar01p1.htm.
Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn.com/Insurance/Insureyourlife/thelowdownonlifeinsurancwennedicalexams.aspx definition of insurance, New Penguin Business Dictionary, Retreieved Oct. 26, 2008 from http://www.credoreference.com/entry/6892512/.
R.C. Olmstead, "Our Products" May 2008.
u1—Discovery Life "Benefit version Reference Guide" Oct. 2008.
v1—Discovery Life—"Discovery life Group Risk Life Plan".
w1 WenfinWebPages for Discovery Life Nov. 13, 2006.
x1 AFLAC—Discovery Life "Application for Discovery Card Protector" Nov. 2007.
u2—Discovery Life "The Disovery Life Portfolio" Nov. 20, 2008.
w2 Discovery Life "Discovery Individual Lie Plan Guide" Aug. 4, 2009 EconEdLink—How Long is Your life?—Tutorial from EconEdLink.com web-site, posted Sep. 13, 2004.
x2 Discovery Life "The Discovery Life Portfolio" Jun. 2008.
u3 Discovery Invest Group Retirement {Plan Financial Solutions for employees: Oct. 17, 2009.
U -ATG Customer Success Story: Discovery Heathly 2006 ART Tech Group, Inc.
V Discovery Vitality; Discovery Vitality 2009 Sep. 12, 2008.
W Discovery Invest, Group Retirement Plan Finanical solutions for employees Jan. 17, 2009.
X Baker et al. Pay for Performance Incentive Programs in Healthcare; Market Dynammics and Business Process-Research Report 2003.
u PruHealth, Individual Policy Document Jul. 2008.
v Discovery Vitality, Lesson Plans Grade 4 nad 5 Apr. 2, 2008.
w HLC Financial Services, Discovery News Feb. 2009.
U The Discovery Life, "Technical guide for financial advisers" Nov. 2008.
U1 Gore, The case for Consumer Engagement in the funding of Healthcare IAAHS 2007.
V1 Preferred Health Systems—Preferred News—vol. 9, issue 1, Spring 2008.
W1 Discovery Why Discovery Life May 29, 2008.
X1 BX Link Your Company Websites Discovery Life Plans Jan. 13, 2003.
U2 Destiny Health Individual Brochure Health Coverage modified Oct. 18, 2006.
V2 DaSilva Roseanne The Impact of Wellness Activities on Hospital Claims Experience, Joint Colloquium of the IACA, PBSS and IAAHS May 2008 Oct. 1, 2004.
International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).
International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).
Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report for PCT/IB2007/053760 filed Sep. 18, 2007 (WO2008/035280).
Written Opinion for PCT/IB2007/053760 filed Sep. 18, 2007 (WO2008/035280).
International Preliminary Report on Patentability for PCT/IB2007/053760 filed Sep. 18, 2007 (WO2008/035280).
International Search Report dated Nov. 2, 2011 for PCT/IB11/51627 (WO2011/128873).
Andrew Cohen; Putting Wellness to work; date Mar. 1, 1997; Athletic Business, pp. 1-7.
www.netpulse.net; Netpulsue Makes Working Out More than a Calorie-Burning Session; date Mar. 21, 1998, pp. 1-2.
www.netpulse.net; 24 Hour Fitness Partners with Netpulse; date Mar. 9, 1998; p. 1.
Trends in Medical Benefit Plan Design to Control Claim Costs; Record of Society of Actuaries; date 1982; vol. 8, No. 2, pp. 515-531.
David Richards, Return of Premium Disability Insurance; The Black Hole, dated Jul. 15, 2010, p. 1-4.
"Sidelines" WWD, p. 10—STIC Scientific and Technical Information Center, Feb. 3, 2000.
019 Co-pending U.S. Appl. No. 11/074,453, Final Office Action mailed Jul. 19, 2010.
015 Co-pending U.S. Appl. No. 11/189,647, Request for Continued Examination filed Jul. 19, 2010.
021 Co-pending U.S. Appl. No. 11/715,181, Response filed Aug. 12, 2010.
003-1 Co-pending U.S. Appl. No. 12/112,165, Non-final Office Action mailed Sep. 2, 2010.
004 Co-pending U.S. Appl. No. 10/251,120, Request for Continued Examination filed Oct. 6, 2010.
010 Co-pending U.S. Appl. No. 12/303,391, Non final Office Action mailed Nov. 24, 2010.
019 Co-pending U.S. Appl. No. 11/074,453, Response to final office action Dec. 20, 2010.
002 Co-pending U.S. Appl. No. 09/876,311, Non-final Office Action mailed Jul. 9, 2010.
U.S. Appl. No. 09/876,311, filed Jun. 7, 2001.
U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.

U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.
U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
U.S. Appl. No. 10/344,176, Response to Office Action Nov. 9, 2009.
U.S. Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.
U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.
U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/477,208, filed Jun. 3, 2009.
U.S. Appl. No. 12/303,388, Non-Final Office Action mailed Mar. 11, 2011.
U.S. Appl. No. 12/477,225, filed Jun. 3, 2009.
U.S. Appl. No. 12/477,189, filed Jun. 3, 2009.
U.S. Appl. No. 12/721,619, filed Mar. 11, 2010.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 11/715,181, Response to Office Action Feb. 3, 2010.
U.S. Appl. No. 12/303,395, Non-Final Rejection Jan. 24, 2011.
U.S. Appl. No. 12/912,009 filed Oct. 26, 2010.
U.S. Appl. No. 12/912,040 filed Oct. 26, 2010.
U.S. Appl. No. 12/112,165, Final Rejection Feb. 10, 2011.
U.S. Appl. No. 11/715,181, Response to Office Action Mar. 11, 2011.
014 M. Doty et al., Issue Brief, Maintaining Health Insurance During a Recession, 6 pgs, 2001.
014 R. Merhr, ARIA—The Concept of the Level—Premium Whole Life Insurance Policy, The Journal of Risk and Insurance, vol. 42, No. 3 (Sep. 1975) pp. 419-431.
014 STIC Search Report EIC 3600, Scientific and Technical Information Center, 63 pgs.
Web-site Google Search Google Employee Wellness Payment dated Feb. 12, 2012.
030-South African Patent Journal No. 6 of Jun. 1, 2099, vol. 42, p. 229.
030-South African Patent Application 2008/04810, filed Jun. 26, 2009—Annotated with Paragragh numbers.
030-South African Patents Act, No. 57 of 1978 as amended by Patents Amendment Act No. 58 of 2002.
030-Discovery Life, "Technical guide for financial advisers" Nov. 11, 2009.
U.S. Appl. No. 12/912,009 Response filed Aug. 31, 2012.
U.S. Appl. No. 13/638,608, filed Sep. 30, 2012.
U.S. Appl. No. 13/648,309, filed Oct. 10, 2012.
U.S. Appl. No. 13/641,143, filed Oct. 15, 2012.
U.S. Appl. No. 13/641,145, filed Oct. 15, 2012.
U.S. Appl. No. 13/641,155, filed Oct. 15, 2012.

* cited by examiner

SYSTEM AND METHOD OF MANAGING AN INSURANCE SCHEME

BACKGROUND OF THE INVENTION

The present application relates to a system and method of managing an insurance scheme.

The present invention may be implemented by a traditional life insurance plan operator for its members or may be implemented by another party.

Conventionally, insurance policies such as life insurance policies operate on the basis that an insured person, sometimes referred to as an insured life, pays a premium to the life insurer, and the life insurer pays a predetermined sum, referred to as the sum assured, to the insured life or his/her beneficiary on the occurrence of an insured event. Typical insured events are the insured life suffering disability, contracting a dread disease or dying.

However, methods of calculating an amount of a payout or reward on the occurrence of an insured event are often quite arbitrary.

The present invention provides a system and method of addressing this.

SUMMARY OF THE INVENTION

According to one example embodiment, a system for managing an insurance scheme, the system including:
  a benefit module to define at least one insured event for an insured person and to define at least one benefit to be paid out on the occurrence of one of the insured events;
  a calculation module to alter the at least one benefit based on:
    a) a time factor; and
    b) the life impact of the insured event on the insured person; and
  an awards module to, on the occurrence of the at least one insured event, provide the at least one altered benefit to the insured person.

The calculation module may calculate the life impact of the insured event and allocates a score to this.

In addition, the calculation module may achieve this by further breaking down the life impact into one or more of the following criteria: duration of impact; invasiveness of surgery; pharmacological; therapy or rehabilitation required; chemotherapy or radiotherapy; and assisted devices required or care required.

The calculation module may allocate a point value to each criteria and then the sum of the point values allocated is calculated by the calculation module to determine a total life impact points value.

The calculation module may also calculate the time factor in the form of a durational score by assessing the duration of impact of the insured event and allocating a durational score to this.

In one example embodiment, the calculation module calculates the durational score for a permanent life impact by calculating an average duration to retirement for the insured person.

The calculation module may additionally use an earnings factor to calculate the benefit particularly calculating the earnings factor based on the occupation of the insured person and whether they have a standard salary growth expectation or a high salary growth expectation.

The earnings factor may be calculated as a percentage.

In another example embodiment apparatus for managing an insurance scheme, the apparatus includes:
  means for defining at least one insured event for an insured person;
  means for defining at least one benefit to be paid out on the occurrence of the at least one insured event;
  means for altering the at least one benefit based on:
    a) a time factor; and
    b) the life impact of the insured event on the insured person; and
  means for on the occurrence of the at least one insured event providing the altered at least one benefit to the insured person.

According to another example embodiment, a method of managing an insurance scheme, the method including:
  defining at least one insured event for an insured person;
  defining at least one benefit to be paid out on the occurrence of the at least one insured event;
  altering the at least one benefit based on:
    a) a time factor; and
    b) the life impact of the insured event on the insured person; and
  on the occurrence of the at least one insured event providing the altered at least one benefit to the insured person.

The time factor includes one or more of the age of the insured person at the time of the insured event and the estimated duration of the impact of the insured event.

The at least one benefit is altered further based on c) an earnings factor of the insured person.

The life impact of the insured event may be calculated using one or more of the following criteria: duration of impact; invasiveness of surgery; pharmacological; therapy or rehabilitation required; chemotherapy or radiotherapy; and assisted devices required or care required.

The method may further include assigning a point value to each criteria and then calculating the sum of the point values allocated to determine a total points value, wherein the total life impact points value is used to determine the life impact of the insured event.

In addition, a durational score may be allocated to the time factor depending on one or more of the age of the insured person at the time of the insured event and the duration that the insured event will last.

In this example, the life impact points value is added to the durational value to determine a combined score.

In another example, the total life impact points value is compared with bands of total points values where each of the bands is assigned a life impact status and in this way the life impact is assessed.

The at least one benefit may be altered by a percentage wherein the amount of the percentage is related to a) to c).

DESCRIPTION OF EMBODIMENTS

The systems and methodology described herein relate to a system and method of managing an insurance scheme such as a life insurance scheme to name one example.

Conventional life insurance schemes operate on the basis that an insured person, referred to as the insured life, pays premiums on a regular basis to the life insurer, specifying a sum assured which is an amount to be paid out on the occurrence of an insured event. For example, on the death of the insured life, a predetermined death benefit is paid to the nominated beneficiaries of the insured life. If the insured life is disabled or suffers a dread disease the same or a different amount is paid out.

The method and system will be described with reference to these kinds of schemes but it will be appreciated that the method and system could equally be applied to other types of insurance schemes.

It will also be appreciated that the system and methodology may be implemented by any relevant person or organisation. For example, the system and methodology may be operated by the organisation which operates the life insurance scheme or may be implemented by another associated organisation. In one example the system and methodology may be implemented by a financial organisation which issues credit cards to its members.

For purposes of illustration only, the system and methodology will be described herein as being operated by the managers of a life insurance scheme.

Figure 1:
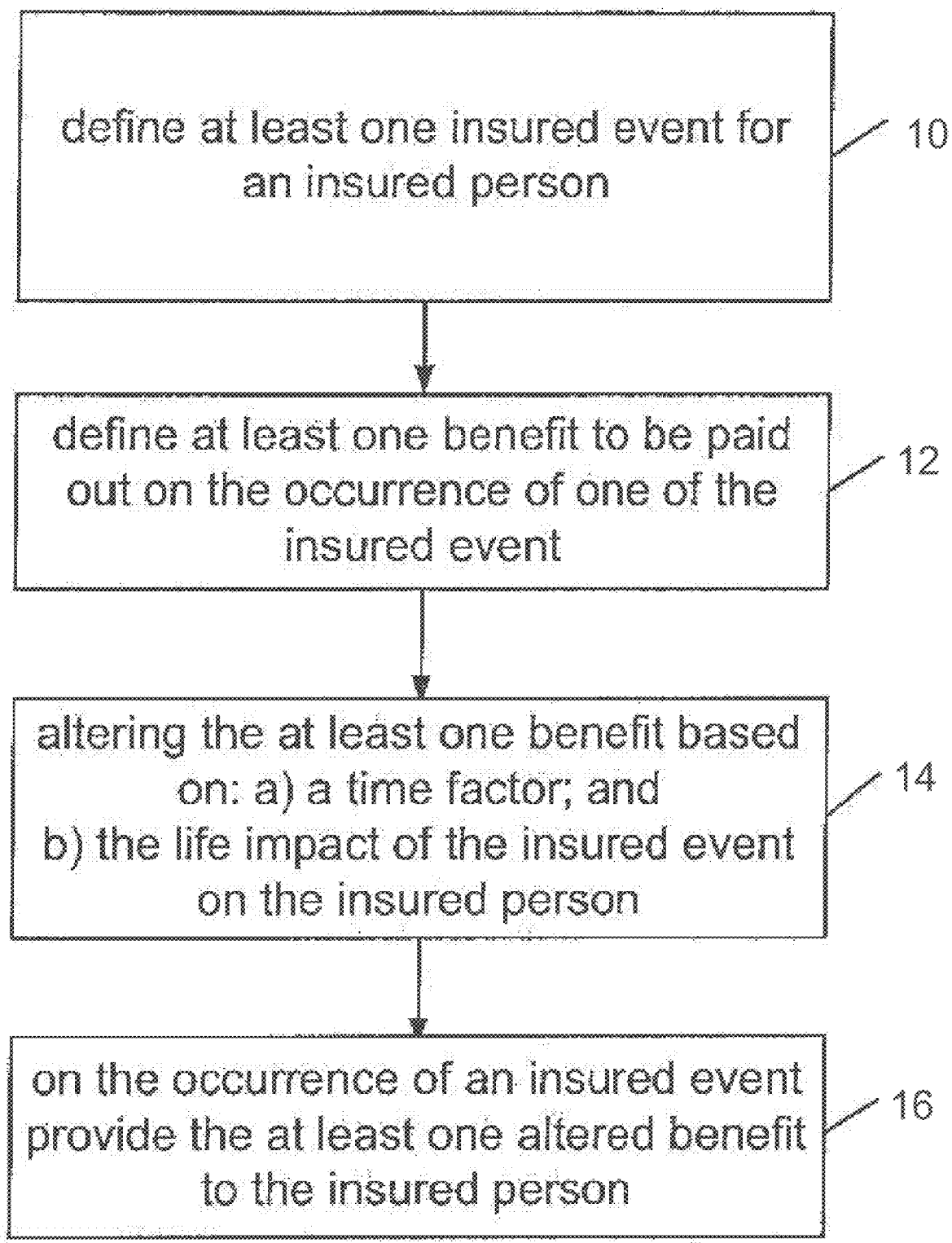
FIG. 1 is a flow chart illustrating the methodology of an example embodiment.

Referring to FIG. 1, a method of managing an insurance scheme includes defining at least one insured event for an insured person (block 10). The at least one insured event may include being injured or suffering a disease for example. The injury may be a temporary injury or a permanent injury for example. The disease may be a so called dread disease for example.

It will be appreciated that the number of insured events defined could be numerous and varied and certainly not limited to the above examples.

At least one benefit to be paid out on the occurrence of the at least one insured event is calculated (block 12).

The amount of the at least one benefit is adjusted (block 14) based on:

a) a time factor; and
b) the life impact of the insured event on the insured person.

The life impact of the insured event is calculated using one or more of the following criteria: duration of impact; invasiveness of surgery; pharmacological; therapy or rehabilitation required; chemotherapy or radiotherapy; and assisted devices required or care required.

In one example, a point value is assigned to each criteria and then the sum of the point values is calculated to determine a total life impact points value. The total life impact points value is used to determine the life impact of the insured event.

In an example embodiment the criteria are allocated points to arrive at a first total points score.

An example of the points values allocated to a few diseases is as follows:

| Disease | 1 | 2 | 3 | 4 | 5 | 6 |
|---|---|---|---|---|---|---|
| AIDS | 2 | 0 | 3 | 0 | 0 | 2 |
| Hodgkins Cancer | 6 | 0 | 0 | 0 | 3 | 0 |
| Otosclerosis | 4 | 1 | 0 | 0 | 0 | 1 |
| Atrial fibrillation | 8 | 0 | 1 | 1 | 0 | 0 |

Where the criteria in the table are:
1—duration of impact;
2—invasiveness of surgery;
3—pharmacological;
4—therapy or rehabilitation required;
5—chemotherapy or radiotherapy; and
6—assisted devices required or care required.

Thus the higher the total points value the larger the life impact of the insured event.

Next a time factor is calculated in the form of a durational score. The score is calculated by assessing the duration of impact of the insured event and allocating a durational score to this. For example:

| Duration Factor | Durational Score |
|---|---|
| 0-2.5 years | 0 |
| 2.5-5 years | 2 |
| 5-7.5 years | 4 |
| 7.5-10 years | 6 |
| 10-12.5 years | 8 |
| 12.5-15 years | 10 |
| 15-17.5 years | 12 |
| 17.5-20 years | 14 |
| 20-22.5 years | 16 |
| 22.5-25 years | 18 |
| 25-27.5 years | 20 |
| 27.5-30 years | 22 |
| 30-32.5 years | 24 |
| 32.5-35 years | 26 |
| 35-37.5 years | 28 |
| 37.5-40 years | 30 |

If the duration of the insured event is permanent, the duration of the durational score reverts to average duration to retirement. For example:

| Age Band | Average Duration to Retirement (Years) |
|---|---|
| <30 | 40.0 |
| 31-40 | 30.0 |
| 41-50 | 20.0 |
| 51-55 | 12.5 |
| 56-60 | 7.5 |
| 61-65 | 2.5 |

The average duration to retirement now becomes the duration factor used above.

Next, the life impact score and the duration score are combined to form a total life time impact score.

This score is used to determine a life impact category where ranges of combined scores fall into different categories.

Finally, in the illustrated example, the life impact category is used together with an earnings factor.

The earnings factor may take a number of forms but in the illustrated example the earnings factor is based on the occupation of the insured person and whether they have a standard salary growth expectation or a high salary growth expectation.

Using all of the above in an illustrative example:

| Total LifeTime Impact score* | LifeTime Impact category | Standard Salary Growth Expectation LifeTime Capital Disability payout* | High Salary Growth Expectation LifeTime Capital Disability payout* |
|---|---|---|---|
| 0-4 | 1 | 100% | 105% |
| 5-9 | 2 | 110% | 125% |
| 10-14 | 3 | 120% | 135% |
| 15-19 | 4 | 130% | 145% |
| 20-24 | 5 | 140% | 155% |
| 25-29 | 6 | 150% | 165% |

-continued

| Total LifeTime Impact score* | LifeTime Impact category | Standard Salary Growth Expectation LifeTime Capital Disability payout* | High Salary Growth Expectation LifeTime Capital Disability payout* |
| --- | --- | --- | --- |
| 30-34 | 7 | 160% | 180% |
| 35-39 | 8 | 170% | 200% |

Thus the amount of the benefit is adjusted by the percentage depending on on life impact and duration of the insured event as well as the expected salary growth of the insured person.

On the occurrence of the at least one insured event the calculated at least one benefit is provided to the insured person (block 16).

Figure 2:
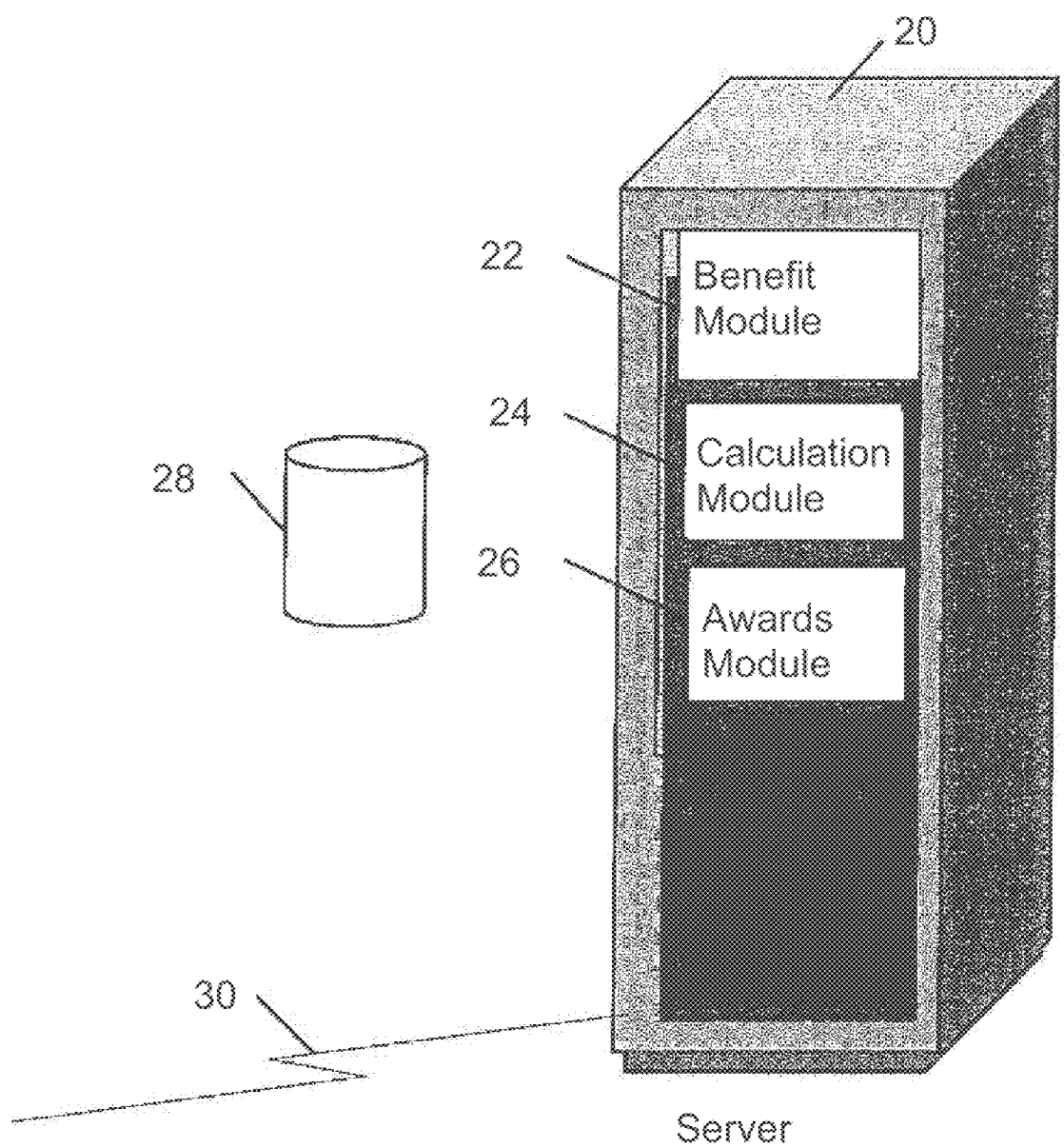
FIG. 2 is a block diagram illustrating an example system to implement the methodologies described herein.

FIG. 2 illustrates an exemplary system for implementing the above methodologies.

A server 20 includes a number of modules to implement the methodologies described above.

A benefit module 22 defines at least one insured event for an insured person.

The module 22 is constructed to define the plurality of insured events which in one embodiment includes disability, contracting a dread disease or dying as these are typical of the kind of events which are insured by life insurance schemes. However, it will be appreciated that in other contexts these life changing events may be other events.

Once the benefit module 22 defines the plurality of life changing events, the module 22 accesses a memory and stores the defined plurality of categories of expenses in the memory.

In one example embodiment, the memory could take the form of the database 28. In other embodiments the memory could be located on the server 20 or on another server not illustrated in this example system. In either case, the memory is in data communication with the module 22 and accessible by the module 22 which is able to read and write data to the memory.

A calculation module 24 is constructed to calculate at least one benefit to be paid out on the occurrence of the at least one insured event. The amount of the at least one benefit is calculated by the calculation module 24 using a plurality of factors including:

a) a time factor; and b) the life impact of the insured event on the insured person.

The calculation module 24 is constructed to calculate a life impact of the insured event and allocate a score to this. The calculation module 24 achieves this by further breaking down the life impact into one or more of the following criteria, for example: duration of impact; invasiveness of surgery; pharmacological; therapy or rehabilitation required; chemotherapy or radiotherapy; and assisted devices required or care required.

In one example, the calculation module 24 allocates a point value to each criteria and then the sum of the point values allocated is calculated by the calculation module 24 to determine a total life impact points value. The total life impact points value is used as the indicator of the life impact of the insured event to the insured person. Thus the higher the total points value the larger the life time impact of the insured event. An example of this has been illustrated above.

The calculation module 24 is constructed to calculate a time factor in the form of a durational score. The score is calculated by the calculation module 24 assessing the duration of impact of the insured event and allocating a durational score to this. Examples of this have been illustrated above.

If the duration of the life impact is permanent, the calculation module 24 calculates the duration of the life impact according to an average duration to retirement. Examples of this have been illustrated above.

The calculation module 24, in one example embodiment, uses the life impact score and the duration score are combined to form a combined score and the combined score is used by the calculation module 24 to determine a life impact category where ranges of combined scores fall into different categories. Examples of this have been illustrated above.

Finally, in an example embodiment, the calculation module 24 uses the life impact category together with an earnings factor.

The earnings factor calculated by the calculation module 24 may take a number of forms but in the illustrated example the earnings factor is calculated by the calculation module 24 based on the occupation of the insured person and whether they have a standard salary growth expectation or a high salary growth expectation.

In one example embodiment the calculation module 24 calculates the earnings factor as a percentage.

In this embodiment the calculation module 24 adjusts the amount of the benefit by the percentage calculated depending as the earnings factor.

The calculation module 24 accesses a memory which may be the database 28 and stores the calculated benefit amount therein.

An awards module 26 is used for, on the occurrence of the at least one insured event, obtaining the benefit amount from the calculation module or from the memory and providing the calculated at least one benefit to the insured person.

As described above, the system includes at least one associated database 28 for storing data to be used by one or more of the above referenced modules.

In addition, the server 20 is typically connected to a communications network 30 for communications with other computers to implement the methodologies described above.

The modules described above may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present invention are not limited to such architecture, and could equally well find application in a distributed, or peer-to-peer, architecture system. Thus the modules illustrated could be located on one or more servers operated by one or more institutions.

It will also be appreciated that in any of these cases the modules form a physical apparatus with physical modules specifically for executing the steps of the method described herein.

Operating Environment

Figure 3:
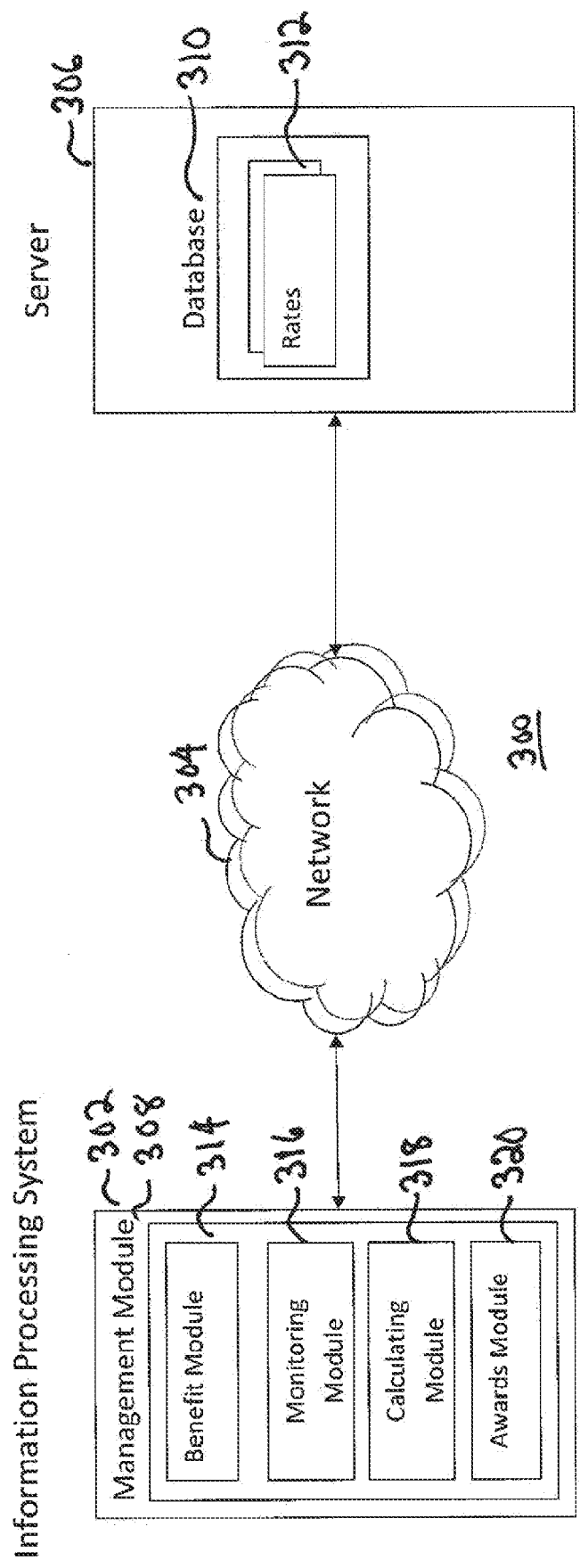
FIG. 3 is a block diagram illustrating an example of one operating environment of the system in FIG. 2.

According to one embodiment of the present invention, as shown in FIG. 3, a system and method of 300 for managing an insurance scheme/product is shown. In one embodiment, the system 300 includes one or information processing systems 302 associated with an insurance provider, a network 304, and one or more servers 306. It should be noted that the information processing system 302 is not restricted to being associated with the entity providing insurance to individuals, but can be associated with another entity as well. The insurance provider can provide one or more types of insurance such as a (but not limited to) life insurance scheme to name one example and/or medical insurance to individuals.

The network 304, in one embodiment, is a wide area network, local area network, wireless network, or the like. The information processing system 302 includes a management module 308. The management module 308, in one embodiment, manages an insurance scheme/product. For example, the management module 308, in one example, manages a life insurance product. In this example, the management module 308 manages the benefits of the life insurance product such as a benefit payout by adjusting a monthly benefit payout to an insured person (or beneficiary).

In one embodiment, the server 306 comprises a database 310 including interest rate information 312 that the management module 308 uses to manage the insurance scheme/product. This process was discussed in greater detail above. The management module 308, in one embodiment, includes a benefit module 314, an optional monitoring module 316, a calculating module 318, and an awards module 320. It should be noted that although this modules 314, 316, 318, 320 are shown as residing within the management module 308, one or more of these modules can reside outside of the management module 308 within the system 302 and/or across multiple information processing systems as well.

The operational flows shown in FIG. 1 illustrate one example of managing an insurance product according to one embodiment of the present invention. In particular, FIG. 1 shows a process performed by the management module 308 and its components 314, 316, 318, 320 within the information processing system(s) 302.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although the various embodiments of the present invention are described in the context of a fully functional computer system, those skilled in the art will appreciate that embodiments are capable of being distributed as a program product via CD or DVD, e.g. CD, CD ROM, or other form of recordable media.

The invention claimed is:

1. A system for managing an insurance plan, comprising:
at least one computer server;
software stored on non-transitory storage medium connected to said least one computer and configured, when executed by said at least one computer, to
receive data defining at least one benefit to be paid out on the occurrence of at least one insured event under the insurance plan;
receive data relating to at least one insured event for an insured person;
receive data defining at least one initial benefit amount to be paid out on the occurrence of one of the insured events including data relating to a life impact value associated with a life impact of the insured event on the insured person;
assigning a criteria point value for a life impact of the insured event, wherein the criteria point value is proportionate to an actual impact of the insured event to the individual insured;
determine a duration point value of the insured event that is proportionate to an assessed duration of the impact of the insured event to the individual insured, and if the duration of the insured event is permanent, then the point value is based upon the insured's age;
calculate the total life impact score by combining the life impact and duration point values;
calculate an earnings factor based upon an income growth expectation for the individual insured, wherein the earnings factor is greater where the individual insured had a high growth expectation as compared to a lower, or standard growth expectation;
calculate an altered benefit amount by adjusting the initial benefit amount by the total life impact score and the earnings factor; and
cause said at least one altered benefit to be paid to a nominated beneficiary.

2. The system of claim 1, wherein the life impact criteria point value is defined based upon at least one criteria relating to the insured event selected from duration of impact; invasiveness of surgery; pharmacological; therapy or rehabilitation required; chemotherapy or radiotherapy; and assisted devices required or care required.

3. A system for managing an insurance plan, comprising:
at least one computer server;
software stored on non-transitory storage medium connected to said least one computer and configured, when executed by said at least one computer, to
receive data defining at least one benefit to be paid out on the occurrence of at least one insured event under the insurance plan;
receive data relating to the age of, projected income of, and an insured event under the insurance plan experienced by, an insured of the insurance plan;
allocate a life impact point value to the insured event, based upon the life impact to the insured due to the insured event, wherein the criteria point value is proportionate to an actual impact of the insured event to the individual insured;
allocate a duration point value to the insured event, based upon a duration of impact to the insured due to the insured event;
combine the life impact point value and the duration point value to calculate a total lifetime impact score;
receive data relating to a salary growth expectation of the insured prior to the insured event;
calculate an salary growth expectation value based upon an income growth expectation for the individual insured, wherein the salary growth expectation value is greater where the individual insured had a high growth expectation as compared to a lower, or standard growth expectation;
calculate an altered benefit by adjusting the at least one benefit using the lifetime impact score and the salary growth expectation value of the insured;
cause said at least one altered benefit to be paid to a nominated beneficiary.

4. The system of claim 3, wherein the software is further configured to
receive data relating to a series of categories defined by a combination of the life impact point value and the duration point value, each of the categories defining a percentage adjustment to the defined benefits to be paid;
adjusting the at least one benefit using the lifetime impact score and the salary growth expectation value of the insured includes adjusting a benefit to be paid to a nominated beneficiary of the insured by multiplying the at least one benefit by the percentage adjustment for the determined category for the insured event.

5. The system of claim 4, wherein the software is further configured to
- allocate a plurality of said series of categories each series defining unique percentage adjustments relative to the other, each of said series associated with a different salary growth expectation,
- selecting one of the plurality of series for determining a category for the insured event based upon the salary growth expectations of the insured.

6. The system of claim 3, wherein the life impact point value is defined based upon at least one criteria relating to the insured event selected from duration of impact, invasiveness of surgery, pharmacology, therapy, rehabilitation, chemotherapy, radiotherapy, assisted devices required, and care required.

7. The system of claim 3, wherein the insured event reduces the salary growth expectation of the insured.

8. The system of claim 3, wherein allocating a duration point value includes adjusting the duration to an expected time until retirement for the insured, where a duration of impact is expected to be permanent.

9. The system of claim 8, wherein the expected time until retirement is determined by selecting the insureds from a series of age ranges.

10. The system of claim 3, wherein the insured event is death, disease, or disability.

11. The system of claim 3, wherein the duration point value is derived from a series of duration ranges.

12. A system for managing an insurance plan, comprising:
- at least one computer server;
- software stored on non-transitory storage medium connected to said least one computer and configured, when executed by said at least one computer, to
  - receive information relating to an insured event of the insured occurring to an individual insured of the insurance plan;
  - obtain an initial benefit amount based upon the insured event;
  - determine a life impact of the insured event by assigning a criteria point value for a life impact of the insured event, wherein the criteria point value is proportionate to an actual impact of the insured event to the individual insured;
  - determine a duration point value of the insured event that is proportionate to an assessed duration of the impact of the insured event to the individual insured, and if the duration of the insured event is permanent, then the point value is based upon the insured's age;
  - calculate the total life impact score by combining the life impact and duration point values;
  - calculate an earnings factor based upon an income growth expectation for the individual insured;
  - calculate an adjusted insured event benefit amount by adjusting the initial benefit amount by the total life impact score and the earnings factor, wherein the earnings factor and the adjusted insured event benefit amount is greater where the individual insured had a high growth expectation as compared to a lower, or standard growth expectation; and
  - cause the at least one altered benefit to be paid to a nominated beneficiary.

13. The system of claim 12, wherein the software is further configured to
- receive data relating to salary growth expectations of the insured prior to the insured event,
- allocate a plurality of said series of categories each series defining unique percentage adjustments relative to the other, each of said series associated with a different salary growth expectation,
- selecting one of the plurality of series for determining a category for the insured event based upon the salary growth expectations of the insured, and
- using the selected one of the plurality of series in calculating an earnings factor.

14. The system of claim 12, wherein the life impact point value is defined based upon at least one criteria relating to the insured event selected from duration of impact, invasiveness of surgery, pharmacology, therapy, rehabilitation, chemotherapy, radiotherapy, assisted devices required, and care required.

15. The system of claim 13, wherein the insured event reduces the salary growth expectation of the insured.

* * * * *